S. B. WINN.
TRAILER BRAKING MEANS FOR TRUCKS AND TRACTORS.
APPLICATION FILED AUG. 5, 1918.
1,378,749.
Patented May 17, 1921.
2 SHEETS—SHEET 1.
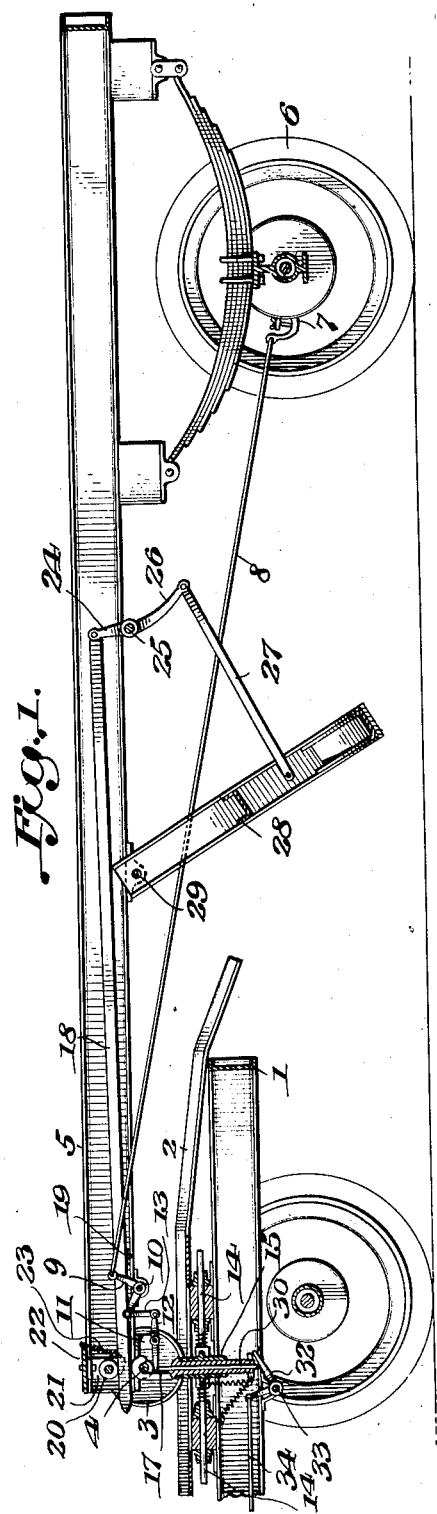
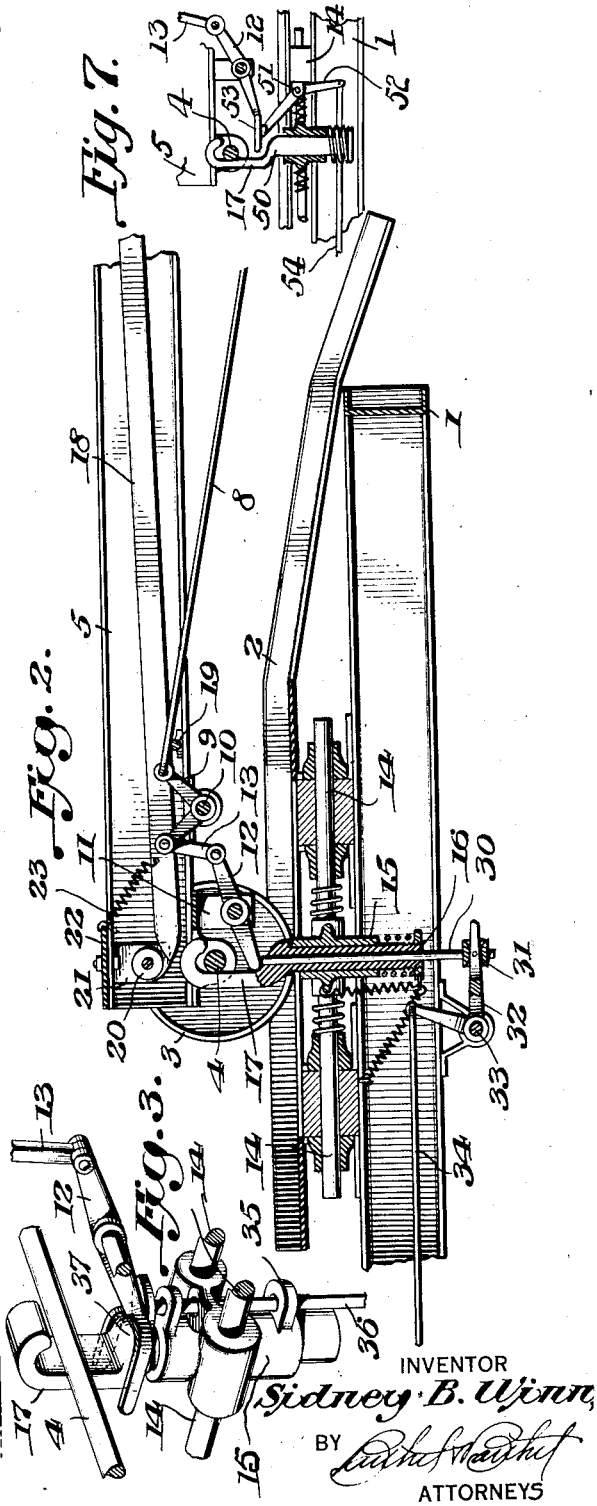
INVENTOR
Sidney B. Winn,
BY
ATTORNEYS

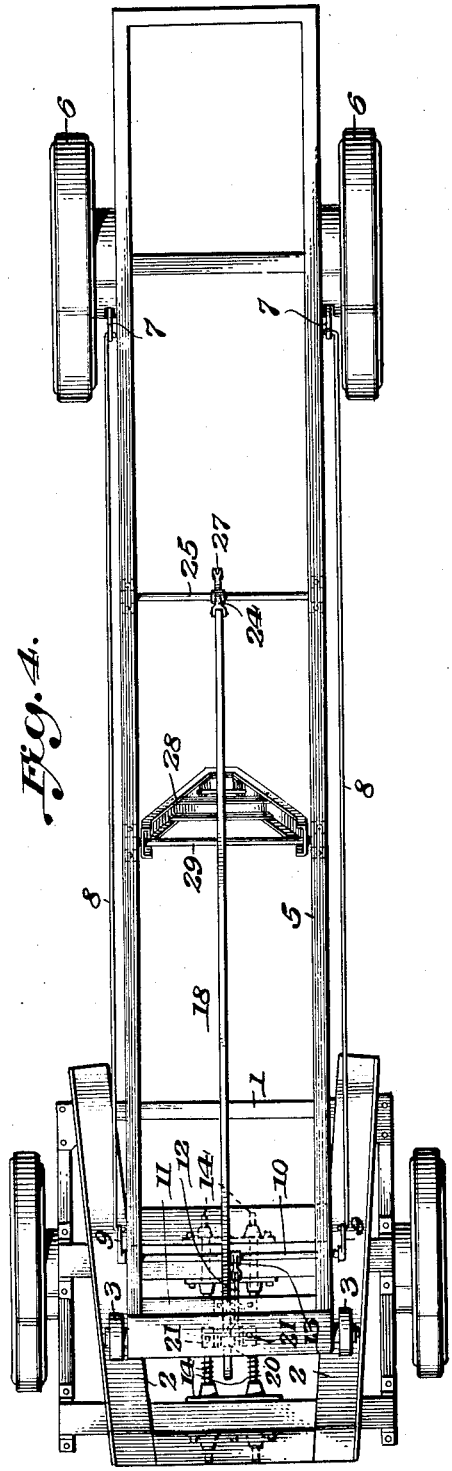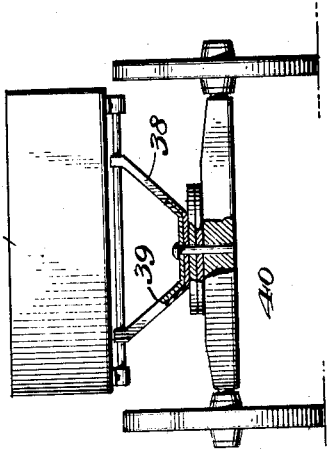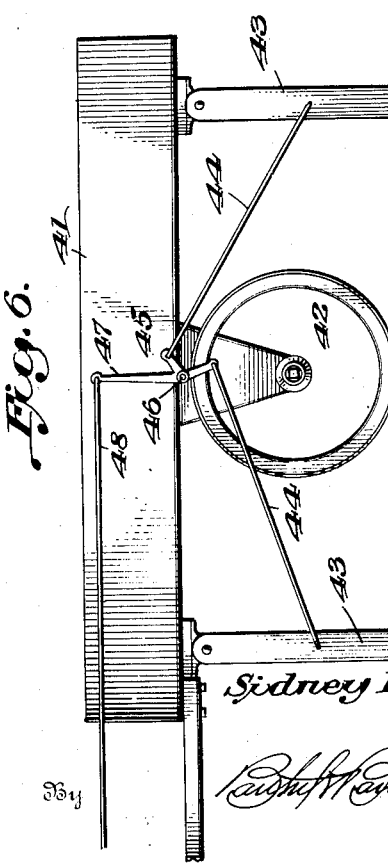

UNITED STATES PATENT OFFICE.

SIDNEY B. WINN, OF LAPEER, MICHIGAN, ASSIGNOR TO LAPEER TRACTOR TRUCK COMPANY, OF LAPEER, MICHIGAN, A CORPORATION OF MICHIGAN.

TRAILER-BRAKING MEANS FOR TRUCKS AND TRACTORS.

1,378,749.  Specification of Letters Patent.  Patented May 17, 1921.

Application filed August 5, 1918. Serial No. 248,291.

*To all whom it may concern:*

Be it known that I, SIDNEY B. WINN, a citizen of the United States of America, residing at Lapeer, in the county of Lapeer and State of Michigan, have invented certain new and useful Improvements in Trailer-Braking Means for Trucks and Tractors, of which the following is a specification, reference being had therein to the accompanying drawings.

This invention relates to trailer braking means for trucks or tractors, and has special reference to certain improvements in connection with the trailer disclosed in my pending application filed Jan. 5, 1918, Serial No. 210,414, also another pending application on a trailer attachment for vehicles filed Jan. 5, 1918, Serial No. 210,413. These applications disclose a trailer adapted to have the forward end thereof connected to the rear end of a truck, tractor or other vehicle, and the trailer has a supporting leg and a brake mechanism, so that when the trailer is unattached the supporting leg will support the forward end of the trailer with the brakes set, thus preventing the trailer from being accidentally moved.

This invention aims to furnish a trailer with a brake mechanism that may be actuated from the truck, tractor or vehicle employed for pulling or pushing the trailer, thus permitting of the operator or driver of the tractor to control a loaded trailer, particularly on a grade, thus precluding any possibility of the trailer crowding or pushing the tractor.

My invention further aims to provide a brake operating mechanism for tractors and trailers that may be actuated irrespective of the position of the trailer relative to the tractor when coupled thereto, and the brake mechanism is furthermore designed so that the mechanism of the tractor will automatically become associated with the mechanism of the trailer when the tractor is coupled to the trailer, and as readily become separate mechanisms when the tractor and trailer are uncoupled.

The present invention also includes certain other improvements, and reference will now be had to the drawings, wherein—

Figure 1 is a longitudinal sectional view of a portion of a tractor and trailer coupled together;

Fig. 2 is an enlarged longitudinal sectional view of a portion of the same, showing the trailer coupling mechanism set for disengagement;

Fig. 3 is a perspective view of a modified form of brake mechanism;

Fig. 4 is a plan of the trailer in an active position relative to the tractor;

Fig. 5 is a front elevation of a modified form of a supporting leg for the trailer, Fig. 6 is a side elevation of a modified form of trailer, and Fig. 7 is a detail view of a modified form of brake actuating mechanism.

In the drawings, the reference numeral 1 denotes the rear end of a tractor or other vehicle provided with a track 2 for supporting wheels 3 on the ends of an axle 4 carried by the forward end of a trailer frame 5. The rear end of the trailer frame 5 has a truck 6 provided with brakes 7 and the brakes are adapted to be actuated by a forwardly extending rod 8 connected to a bell crank 9 pivoted on a transverse rod 10, at the forward end of the trailer frame 5. The trailer frame 5 has a hanger 11 in proximity to the bell crank 9, and pivoted in said hanger is a lever 12, which is pivotally connected by a link 13 to the bell crank 9. The lever 12 extends under the axle 4 and is equidistant from the wheels 3.

On the rear end of the tractor is a draft mechanism 14 including a central support 15 and in said support is a tubular king bolt 16 capable of turning and reciprocating within the support 15. The king bolt 16 has a hook shaped head 17 adapted to receive the axle 4 and when the king bolt is depressed or in a lowered position, the trailer is coupled to the tractor and may be moved thereby.

To hold the king bolt 16 in engagement with the axle 4 a locking bar 18 is employed, and said bar is located centrally of the trailer frame 5. The forward end of the locking bar 18 is supported on a roller 19 carried by the frame 5 and the forward end of said locking bar is tapered and adapted to ride under a roller 20, journaled in a hanger 21, carried by a transverse member 22, on the trailer frame 5. The transverse member 22 is connected by a coiled retractile spring 23 to the locking bar 18, and the rear end of said locking bar is pivotally connected to a crank 24 on a rock shaft 25 supported by the trailer frame 5. The rock shaft 25 has another lever 26 pivotally connected by a link 27 to a supporting leg 28. This supporting leg as best shown in Fig. 4, is V-shaped in front elevation and has the upper end thereof pivotally mounted on a transverse rod 29 carried by the trailer frame 5. When the supporting leg 28 is lowered or in a vertical position it is adapted to coöperate with the truck 6 in supporting the trailer frame 5 and when the leg 28 is raised, the locking bar 18 is shifted forward so that its tapered end will extend between the roller 20 and the head 17 of the king bolt 16. It is then impossible for the tractor to move away from the trailer, as the hook shaped end or bill of the head 17 engages the axle 4 and positively couples the trailer to the tractor.

On account of the locking bar 18 being located centrally of the frame 5 so as to ride over the head 17 of the king bolt 16, it is necesary to set the bell crank 9 to one side, as shown in Fig. 4, and offset the lever 12, thus allowing the forward end of said lever to extend into the head 17 directly above the bore or vertical opening of the king bolt.

Slidable in the tubular king bolt 16 is a rod 30 which has the upper end thereof engaging under the forward end of the lever 12, and the lower end of said rod has a rocker head 31. Engaging the rocker head 31 is a bell crank 32 pivoted on a transverse rod 33 carried by the rear end of the tractor. A rod 34 is connected to the bell crank 32 so as to rock the same, and the rod 34 is adapted to extend forward to the driver's seat of the tractor, where it may be suitably actuated to set and release the brake 7 of the truck 6.

Instead of using a tubular king bolt 16, it is possible to use a solid king bolt and place the rod 30 in parallelism with the king bolt. This is shown in Fig. 3, where the support 15 has suitable guides 35 for a rod 36, said rod having the upper end thereof provided with a head 37 for the forward end of the lever 12. The size of the head 37 is such that the forward end of the lever 12 will always remain in engagement therewith, even when the trailer frame 5 is out of alinement with the tractor. In the preferred form of construction, the forward end of the lever 12 is always in position to be actuated by the rod 30, even when the trailer frame 5 is at an angle to the tractor, consequently the brakes of the trailer can be controlled when descending a curved road or street.

In Fig. 5 there is illustrated a modified form of supporting leg 38, said leg having the lower end thereof provided with a fifth wheel 39 and a truck 40. The supporting leg 38 is adapted to be raised and lowered similar to the supporting leg 28, and when lowered, said supporting leg permits of the trailer being moved about, when not attached to the tractor.

Another improvement resides in the trailer 41 shown in Fig. 6, this trailer having a truck 42 intermediate the ends thereof. To support the trailer 41 when not attached to a tractor, said trailer has pivoted supporting legs 43 at the ends thereof, said legs being connected by links 44 to cranks 45 on a rock shaft 46, supported by the trailer 41. The rock shaft 46 has another crank 47 to which is connected a rod 48, and said rod is adapted to extend forward to a tractor so that the supporting legs 43 may be raised and lowered at will, particularly lowered before the tractor is uncoupled from the trailer.

From the foregoing, it will be observed that the king bolt 16 serves as a coupling device for connecting the trailer to the tractor, and also as a housing for means rendering the brake mechanism of the trailer operative by the brake mechanism of the tractor, it really being immaterial whether the rod 34 is actuated independent of the brake mechanism of the tractor or simultaneously therewith; my invention residing in the control of the trailer brakes from the tractor irrespective of the equipment on the tractor.

In lieu of the fifth wheel 39 I may employ a universal joint effect. such as shown, for instance, in my companion application, filed August 23, 1918, Serial No. 251,046, so that the truck 40 may have a universal movement relative to the trailer.

Instead of using the tubular king bolt 16 and rod 30 I may use a solid king bolt 50, as shown in Fig. 7; provide the draft rigging 14 with a bearing 51 for a bell crank 52, and have a head on it extend under a yoke shaped head 53 on the end of the lever 12. In this manner an actuating rod 54 can be connected to the bell crank 52 to actuate the brake mechanism and thus eliminate a portion of the mechanism heretofore described.

What I claim is:—

1. In combination, a tractor and a trailer adapted to be coupled together with the forward end of the trailer supported by the tractor, a coupling device connecting said tractor and said trailer, said coupling device being adapted for engagement and disengagement by relative movement of the trailer and tractor in the general direction of length of the trailer, a brake mechanism for said trailer, and brake operating mechanism carried by said tractor and operatively connected to the brake mechanism of said trailer, said operating mechanism being adapted to be rendered inactive automatically by the separation of the trailer and tractor.

2. In combination, a tractor and a trailer adapted to be coupled together with the forward end of the trailer supported by the tractor, a coupling device connecting said tractor and said trailer, said coupling device being adapted for engagement and disengagement by relative movement of the trailer and tractor in the general direction of length of the trailer, a brake mechanism for said trailer, and means carried by said tractor adapted for controlling the brake mechanism of said trailer, said means being adapted to be rendered inactive automatically by the uncoupling separation of the tractor and trailer.

3. In combination a tractor and trailer detachably engageable at will with the front end of the trailer supported by the tractor and with the coupling device operative to permit engagement and disengagement by relative movement in the general direction of length of the trailer, brake mechanism carried by the trailer, and means for controlling the operations of said mechanism from the tractor, said means being inactive when trailer and tractor are separated and rendered active automatically by the coupling of trailer and tractor.

4. In combination a tractor and trailer detachably engageable at will with the front end of the trailer supported by the tractor and with the coupling device operative to permit engagement and disengagement by relative movement in the general direction of length of the trailer, brake mechanism carried by the trailer, and means for controlling the operations of said mechanism from the tractor, said means being inactive when trailer and tractor are separated and rendered active automatically when the trailer and tractor are brought into coupling relation.

5. In combination a tractor and trailer detachably engageable at will with the front end of the trailer supported by the tractor and with the coupling device operative to permit engagement and disengagement by relative movement in the general direction of length of the trailer, brake mechanism carried by the trailer, and means for controlling the operations of said mechanism from the tractor, said means including members carried by and movable with the tractor and trailer respectively, said members being relatively positioned to locate them in coöperative relation when the trailer and tractor are brought into coupling relation.

6. In combination a tractor and trailer detachably engageable at will with the front end of the trailer supported by the tractor and with the coupling device operative to permit engagement and disengagement by relative movement in the general direction of length of the trailer, brake mechanism carried by the trailer, and means for controlling the operations of said mechanism from the tractor, said means including members carried by and movable with the tractor and trailer respectively, said members being relatively positioned to locate them in coöperative relation when the trailer and tractor are brought into coupling relation, the tractor member being permanently located below the plane of the trailer and tractor coupling plane.

7. In combination a tractor and trailer detachably engageable at will with the engaging elements including a king-bolt device carried by the tractor, brake mechanism carried by the trailer, and means for controlling the operations of said mechanism from the tractor, said means including members carried by and movable with the tractor and trailer respectively, said members being relatively positioned to locate them in coöperative relation when the trailer and tractor are brought into coupling relation, the trailer member extending into juxtaposition to the king-bolt device, the tractor member being permanently located below the trailer and tractor coupling plane.

8. The combination with a tractor and trailer detachably engageable at will with the engageable elements including a king-bolt carried by the tractor and shiftable in the direction of its length between coupling and uncoupling positions, of brake mechanism carried by the trailer, and means for controlling the operations of said mechanism from the tractor, said means including members carried by and movable with the trailer and tractor respectively, said members being relatively positioned to locate them in coöperative relation when the trailer and tractor are brought into coupling relation, the tractor member being shiftable in the direction of shifting movement of the king-bolt with the member shifting movements independent of the bolt shifting movements.

In testimony whereof I affix my signature in the presence of two witnesses.

SIDNEY B. WINN.

Witnesses:
  E. E. MIX,
  G. R. BUCK.